June 29, 1965 S. GUARNASCHELLI 3,191,973
PIPE COUPLING WITH FLEXIBLE SEALING LIP
Filed Feb. 1, 1963
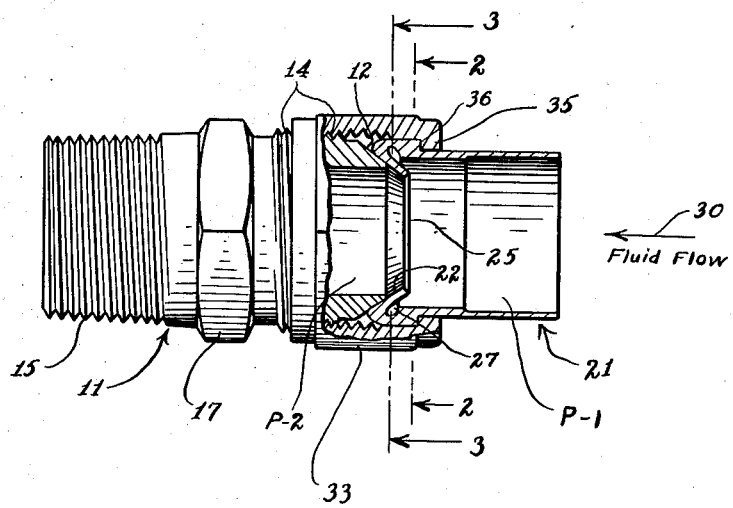
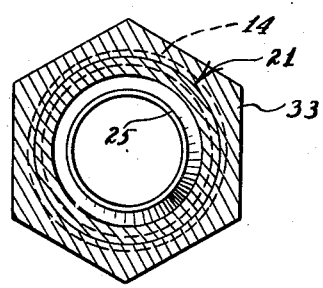
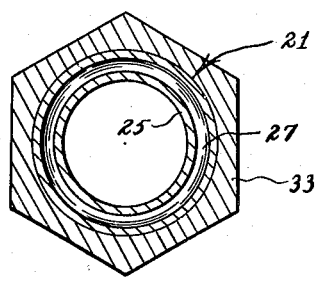
INVENTOR.
Stephen Guarnaschelli
BY Emery Varney,
Whittemore & Dix.
ATTORNEYS 3,191,973
PIPE COUPLING WITH FLEXIBLE SEALING LIP
Stephen Guarnaschelli, Garden City, Long Island, N.Y.
Substituted for abandoned application Ser. No. 475,486,
Dec. 15, 1954. This application Feb. 1, 1963, Ser. No.
256,209
1 Claim. (Cl. 285—110)

This invention relates to means for connecting tubular elements together and more particularly to the sealing of confronting faces at a fitting. The invention is intended more particularly for the sealing of conical seat fittings.

It is an object of the invention to provide an improved tubing connection and more especially a tube fitting in which the leakage of fluid from the fitting is prevented, at least in part, by sealing pressure exerted by the fluid flowing through the fitting.

One feature of the invention relates to a construction of a fitting in such a way that one of the confronting faces of the fitting is yieldable and has space behind it into which fluid enters to exert a pressure toward the other face. There is a connection between the elements of the fitting against which the reaction force is exerted.

Other objects, features and advantages of the invention will appear or be pointed out as the description proceeds.

In the drawings, forming a part hereof, in which like characters indicate corresponding parts in all the views;

FIGURE 1 is a side view, partly in section, showing a fitting made in accordance with this invention; and FIGURES 2 and 3 are sectional views taken on the lines 2—2 and 3—3 respectively, of FIGURE 1.

The fitting illustrated in FIGURE 1 includes a first element 11 having a conical seat 12 at one end. A short distance back from the conical seat 12 there are threads 14 extending along a portion of the outside surface of the fitting element 11. The other end of the element 11 has threads 15 for connecting it with a coupling or any other part of a pipe system in which the fitting is to be used. There is a polygonal flange intermediate the ends of the fitting element 11 for receiving a wrench.

A second fitting element 21 has a face 22 which is complementary to the face 12. In the preferred construction, these faces are frusto-conical and have the same angle of taper as conventional commercial fittings, that is, 37½° or 45°.

The face 22 is on the outer surface of a flange 25 which is an inwardly turned lip of the fitting element 21 in the construction illustrated. This flange 25 is resilient and has sufficient flexibility so that it can be distorted slightly by pressure behind it to obtain a tight seal between the faces 12 and 22. There is an annular pocket 27 behind the flange 22 and this pocket 27 opens into the passage through the fitting 21 so that the pressure of the fluid in this fitting element 21 is exerted against the back of the flange 25.

The diameter of the passage through the flange 25 is smaller than the diameter of the fitting element 21. The diameter of the passage in the first fitting element 11 is also smaller than the diameter of the passage through the second fitting element 21 behind the flange 25. The purpose of these reductions in diameter is to obtain a pressure difference for sealing the flange 25 against the seat 12 when the direction of fluid is that indicated by the arrow 30.

In any piping system there is a progressive reduction in pressure from the upstream to the downstream end of the system. With this invention, a reduction in diameter and cross section of the passage is used to produce a greater pressure drop at the region where the pressure is to be used for sealing the fitting. For example, the pressure upstream from the flange 25 is indicated by legend P–1. The pressure downstream from the flange 25 is indicated by legend P–2. Because of the partial obstruction offered by the reduction in cross section of the passage, P–1 substantially greater than P–2 and it can be made larger or smaller, in proportion to P–2 by designing the fitting with various changes in diameter.

In the preferred construction, the flange 25 extends inwardly beyond the inside wall of the fitting 11 and this inside wall has a smaller diameter than the passage through the fitting 21 upstream from the flange 25.

While this relation is advantageous because of the combined static and dynamic pressure exerted against the flange 25, the construction can be modified by having the passage through the flange equal or less than the reduced passage diameter in the fitting 11 downstream from the flange; or the passage in the fitting 11 can be made with the same diameter as the passage through the fitting 21 upstream from the pocket 27.

The fitting elements 11 and 21 are held together by a nut 33. This nut 33 fits over the threads 14 of the fitting element 11 and there is a lip 35 at one end of the nut 33. This lip 35 fits behind a shoulder 36 on the outside of the fitting 21 for clamping the fitting 21 against the fitting 11. When the nut is tightened, the flange 25 yields to conform tightly to face 12 and maintains a spring loading which prevents leakage or loosening of the connection. Flange 25 is formed so that the best fit is made when the nut is tightened.

When fluid pressure in the pocket 27 is exerted against the back of the flange 25, there is a reaction pressure, in the opposite direction against the other side of the pocket. Because of this reaction pressure, and the longitudinal pressure in the piping system, the pressure of the fluid against the back of the flange 25 cannot be used to hold the fitting elements 11 and 21 together. The nut 33 is used, therefore, to provide a connection between the fittings against which the reaction force can be exerted so that the fluid pressure behind the flange 25 is effective for thrusting the face 22 of the flange tightly against the face 12 of the first fitting element 11.

The fitting element 21 is shown without threads and it is intended to be secured to a tube end, or other part of the piping system, by sweating, brazing, welding, or any other suitable method of bonding. The invention can, however, be made with threads on the fitting 21 if such a construction is desired.

The preferred embodiment of the invention has been illustrated and described, but changes and modifications can be made, and some features can be used in different combinations without departing from the invention as defined in the claim.

What is claimed is:

A tube joint for fluid pressure sealing when fluid flows in one direction through the joint comprising, a first fitting element having an inwardly extending conical face, a second fitting element having an inwardly extending reentrantly bent yieldable resilient conical flange, said flange having a complementary face contacting that of said first fitting element, an annular pocket formed at the apex of said reentrant bend and opening on the upstream side of said flange, the upstream surface of said flange being exposed via said annular pocket to the fluid pressure caused by fluid flow on the upstream side thereof, whereby said flange is yieldably responsive to fluid flow pressure, said second fitting having a larger inside cross section exposed to the fluid flow on the upstream side of the flange than on the downstream side, the conical face of said first fitting sloping inwardly toward the adjacent end of said first fitting element, the confronting face on said second fitting element being sloped at an angle of taper so as to bear on said first fitting element, and fastening means for holding said fitting elements together.

References Cited by the Examiner

UNITED STATES PATENTS

| | | | |
|---|---|---|---|
| 1,589,469 | 6/26 | Homand | 285—100 |
| 1,656,222 | 1/28 | Oakley | 285—386 |
| 2,558,695 | 6/51 | Unger | 285—110 X |
| 3,069,187 | 12/62 | Collins et al. | 285—110 |
| 3,145,035 | 8/64 | Hanback. | |

FOREIGN PATENTS 272   93   Great Britain.

CARL W. TOMLIN, *Primary Examiner.*